Oct. 16, 1934.    P. DE MATTIA    1,977,119

VULCANIZER

Filed May 13, 1930    7 Sheets-Sheet 1

INVENTOR
PETER DE MATTIA

BY Ely & Barrow

ATTORNEYS

Oct. 16, 1934.    P. DE MATTIA    1,977,119
VULCANIZER
Filed May 13, 1930    7 Sheets-Sheet 4

INVENTOR
PETER DE MATTIA
BY Ely H Barrow
ATTORNEYS

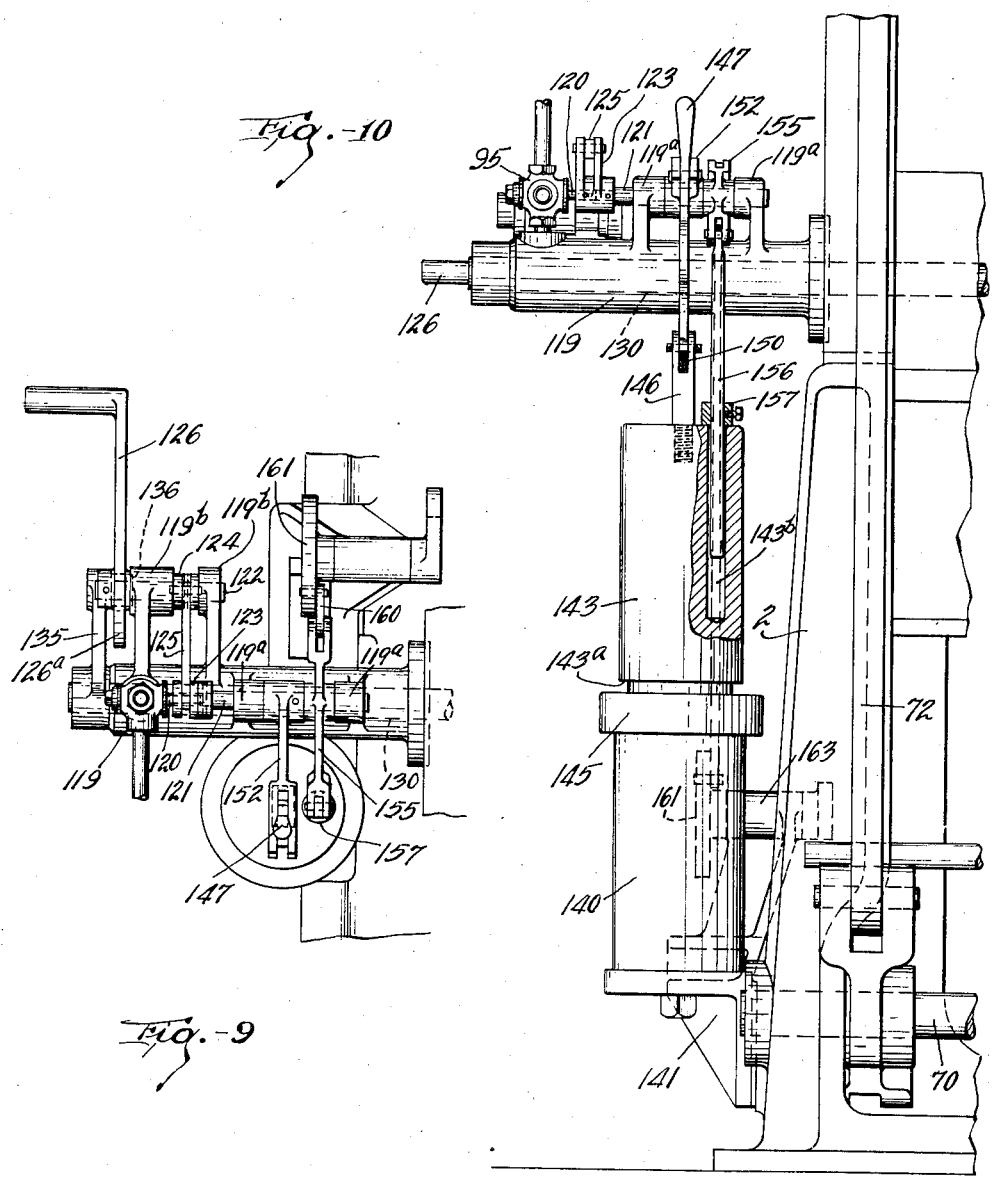

Patented Oct. 16, 1934

1,977,119

UNITED STATES PATENT OFFICE 1,977,119

VULCANIZER

Peter De Mattia, Passaic, N. J., assignor to National Rubber Machinery Company, Akron, Ohio, a corporation of Ohio Application May 13, 1930, Serial No. 451,973

17 Claims. (Cl. 18—17)

This invention relates to vulcanizing apparatus and more particularly to individual pneumatic tire vulcanizers.

The general purpose of the invention is to provide a fully automatic vulcanizer which is relatively simple and inexpensive in construction and effective in operation.

One object of the invention is to provide an improved toggle mechanism for clamping the respective mold members of the vulcanizer together during the cure and for cracking or breaking the members apart upon completion of the cure.

A further object of the invention is to provide means for progressively breaking the vulcanized tire or other article from the mold. The tire is preferably first separated at a point remote from the hinge between the mold members.

Again it is an object of the invention to provide interengaging means between the vulcanizer opening means and the pressure means supplying fluid to the interior of the hollow article which prevents the vulcanizer from opening until the pressure in the interior of the hollow article is relieved.

Another object of the invention is the provision of a two-hand control for the vulcanizer which renders accidental operation impossible.

A further object of the invention is to improve the mechanism for clamping the sections of the mold together, a lever mechanism having been designed which operates to exert a powerful squeezing action upon the two sections of the vulcanizer, the said mechanism engaging and disengaging automatically during the operation of the vulcanizer.

A further object is the provision of a fully automatic control so that the operator need only remove the cured tire or other article, insert a green or uncured one, throw the operating handles and leave the vulcanizer until the automatic opening thereof indicates that the cure has been completed and that the operator may again repeat the process.

The above and other objects of the invention are achieved by the apparatus illustrated in the accompanying drawings and described below, it being understood that the invention is not limited to the exact form thereof shown and described. However, in view of the fact that the invention is particularly designed for the vulcanization of pneumatic tires, the description and the accompanying drawings have been directed to this application of the invention.

In the accompanying drawings:

Figure 9 is a plan view of the parts shown in Figure 8; and

Figure 10 is a rear elevation of the parts shown in Figure 8.

Figure 4:
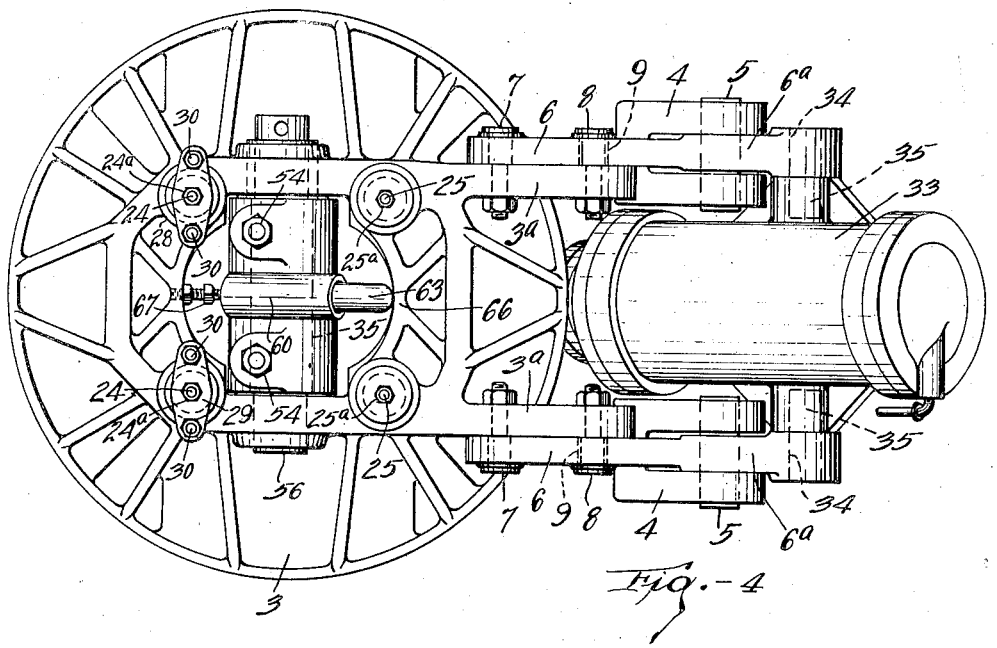
Figure 4 is a top plan view of the vulcanizer.

Referring to the drawings, the vulcanizer comprises a lower fixed platen 1, which is for convenience inclined downwardly as shown, being supported on a suitable base or frame 2. The upper movable platen is indicated at 3. The lower platen 1 is provided at the rear with a pair of spaced arms 4 which are bifurcated and apertured for the reception of axially aligned hinge pins 5. A pair of spaced arms 6 which enter the bifurcated ends of the arms 4 are pivotally supported therein by the hinge pins 5. The hinge arms 6 are secured by means of shouldered bolts 7 and 8 to ribs 3ª on the upper platen. The bolts 7 have a fairly snug fit in said arms and ribs while the bolts 8 have a comparatively loose fit as indicated at 9 in Figure 4. This construction allows a slight freedom of movement or play of the upper platen 3 in a direction parallel to its axis in the closing and opening of the mold, so as to facilitate and insure the seating and unseating of the mold sections as hereafter described.

A pair of cooperating jacketed annular mold sections or halves 12 and 13 are removably secured to the respective platens 1 and 3 by suitable means (not shown), the mold sections having connections thereto for supplying a heated fluid to the jackets thereof, as is well understood in the art.

The numeral 14 indicates a tire which is adapted to be vulcanized by the apparatus. The tire must be expanded against the mold surfaces during the curing and for this purpose means are provided to supply a fluid under pressure to the interior thereof. This is preferably accomplished by the use of the well-known pressure bag 15 to which steam, air or hot water under pressure may be supplied during the period of vulcanization.

A pair of bead molding rings 17 and 18 are provided and are arranged to engage the beads of the tire and to strip the tire from the mold upon the opening of the vulcanizer, the lower ring 17 being used to support a green, uncured tire spaced from the walls of the molds until the vulcanizer is closed. The bead rings are seated in suitable channels in the mold halves. To actuate the lower ring 17 to strip a tire from the mold, means such as rods 20 may be secured thereto, these extending downwardly through apertures in the mold half 13 and through the lower platen 1 below which the rods project whereby they are adapted to be engaged by mechanism hereinafter described to be lifted with the tire as the mold is opened.

The upper bead ring 18 is supported by suitable means such as a plurality of short posts 23 extending through apertures in the upper mold section, which posts are flexibly secured to rods 24 and 25 extending through apertures in the upper platen. The rods 24 remote from the hinge 5 of the platens are normally urged downwardly by means which may include compression springs 27 acting between a collar 28 fixed on the rods and a cross head 29 adjustably secured to the platen 12 by the rods 30. The rods 25 are permitted a certain freedom of movement in the upper platen. The downward movement of the bead ring 18 and its limit of separation from the upper mold section is adjustably determined by the position of lock nuts 24ᵃ and 25ᵃ on the rods 24 and 25.

The vulcanizer is preferably arranged so that it can be opened and closed and locked by fluid pressure and to this end the arms 6 pivotally supporting the movable upper platen 3 are extended past their hinge or pivot as at 6ᵃ and pivotally carry a fluid pressure cylinder 33 on stub shafts 34 in the ends of the arms 6 and received in lugs 35 on the sides of the cylinder. On the under side of the lower platen 1 are formed oppositely positioned substantial bearing lugs 36 in which are located bearing pins 37. On the pins 37 are pivoted by extensions 38 the two arms of a bifurcated lever 39, having upper curved surfaces 39ᵃ bearing against the under surfaces of the pins 37. The lower end of the lever 39 is pivotally connected to the rod 40 extending from the piston of the cylinder 33.

Figure 1:
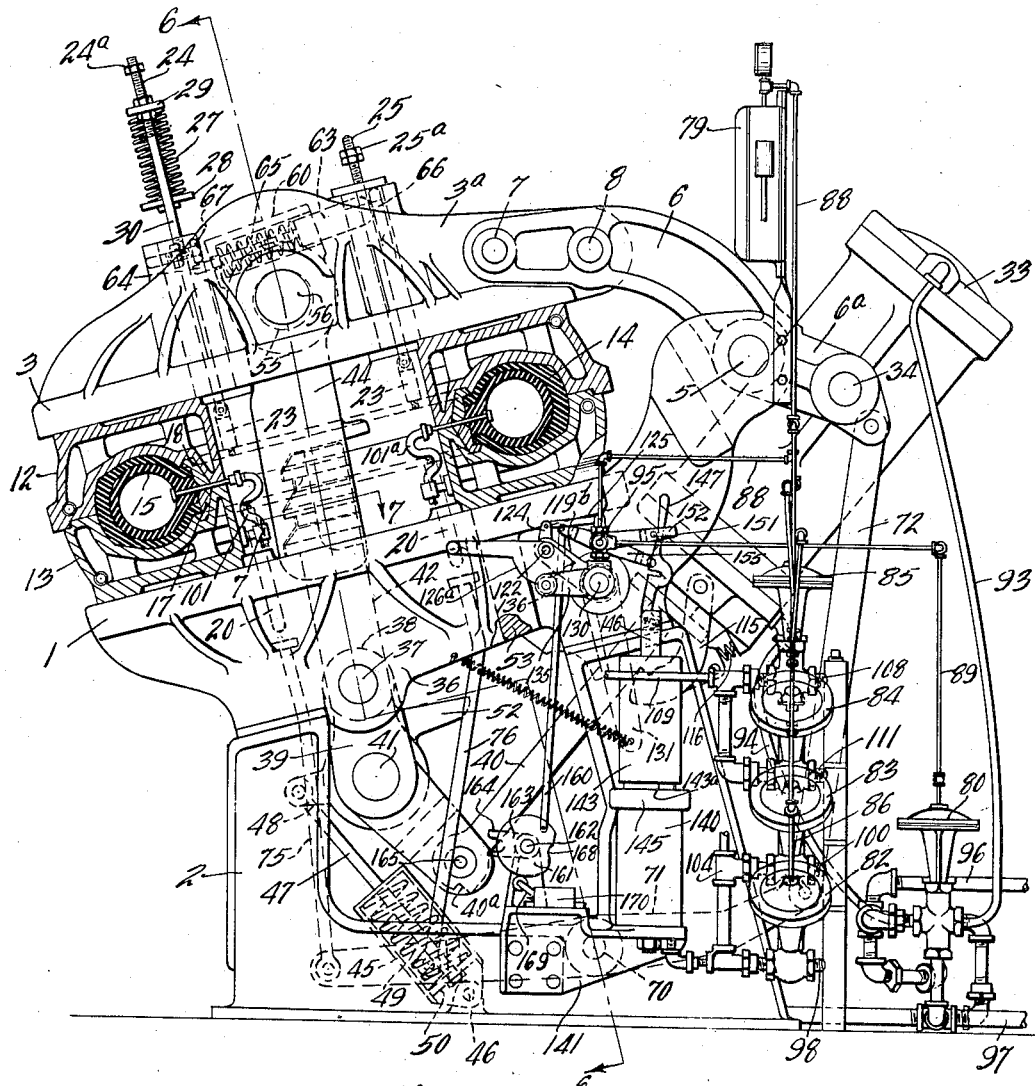
Figure 1 is a side elevation, partly broken away, of a vulcanizer embodying the invention, showing it in the closed or vulcanizing position.
Figure 7:
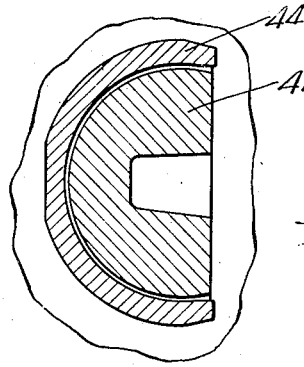
Figure 7 is a sectional view taken on line 7—7 of Figure 1.
Figure 2:
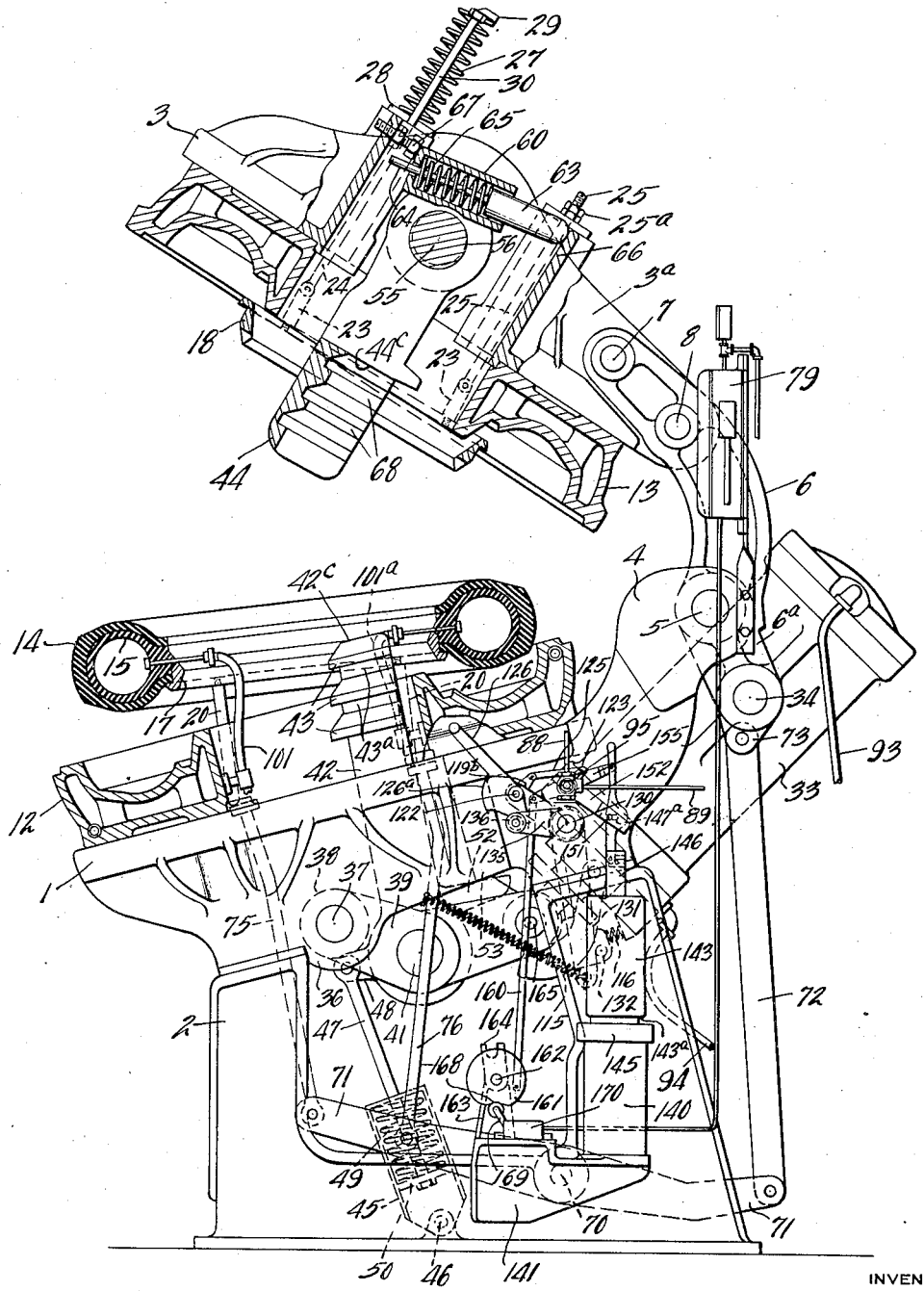
Figure 2 is a view similar to Figure 1 showing the vulcanizer in the open position.
Figure 3:
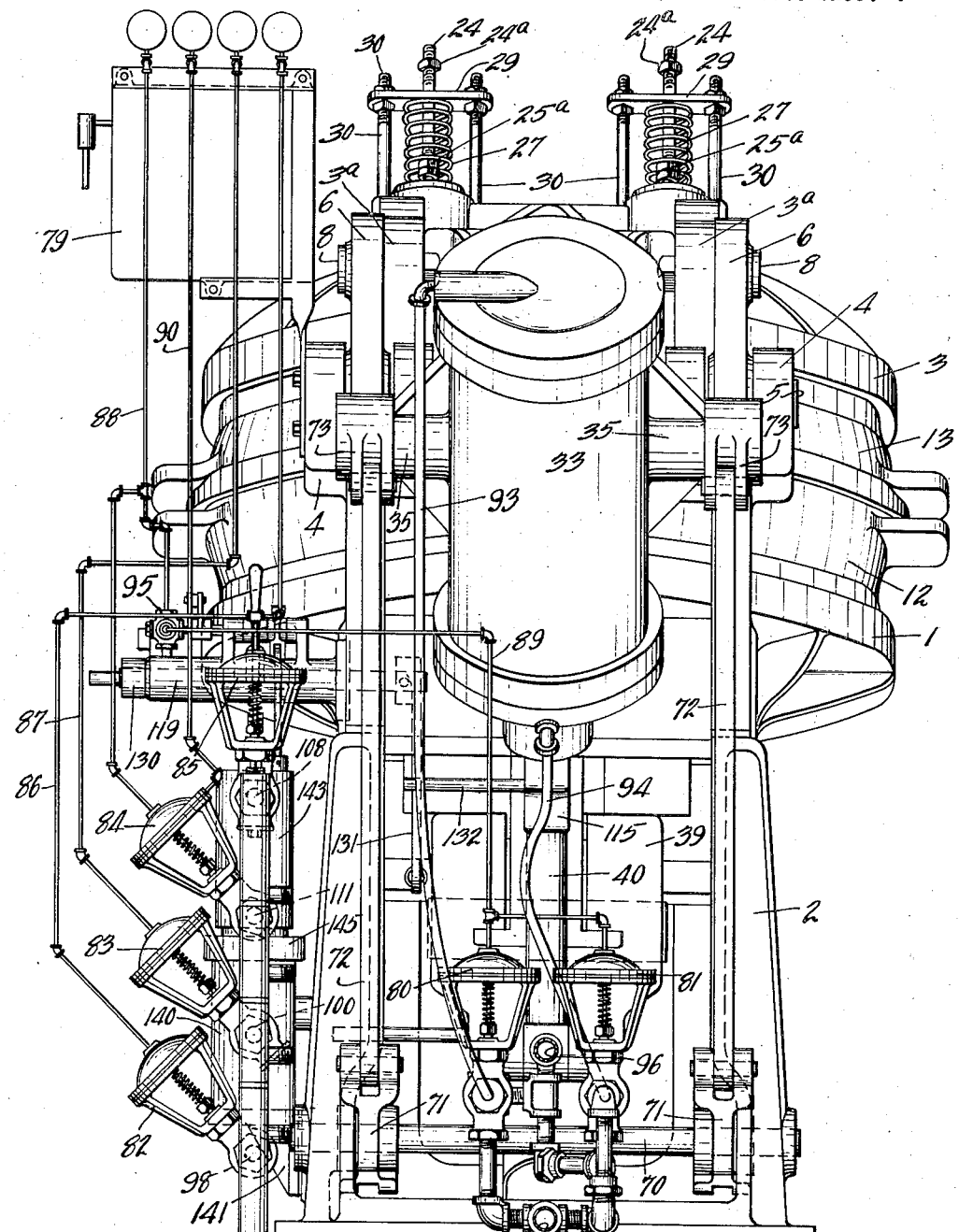
Figure 3 is a rear elevation of the vulcanizer in the closed or vulcanizing position.

The lever 39, in its bifurcated portion, is provided with a pin 41 on which is pivotally carried a locking post 42, formed at its upper end with a plurality of claw-like ribs or formations 43, which cooperate with a mating locking block 44 secured to the upper or movable platen 3. In order to hold the post 42 in normally forward position, a tension device is provided, which may comprise a pivoted casing 45 pivoted to the base as at 46. A link 47 is pivotally connected to a lug 48 extending from the post 42 and extends into the casing 45 where a compression spring 49 is confined, bearing against a plate 50 on the lower end of the link. This tension device serves to swing the locking post 42 about the shaft 41 to hold it forward against and in engagement with the locking block 44. The locking post 42 is also provided with a lug 52 which is adapted to cooperate upon the retraction of the piston with a stop 53 on the lower platen 1 as shown in Figures 1 and 2 to disengage the locking post 42 and the locking block 44 as hereinafter more fully described.

Figure 6:
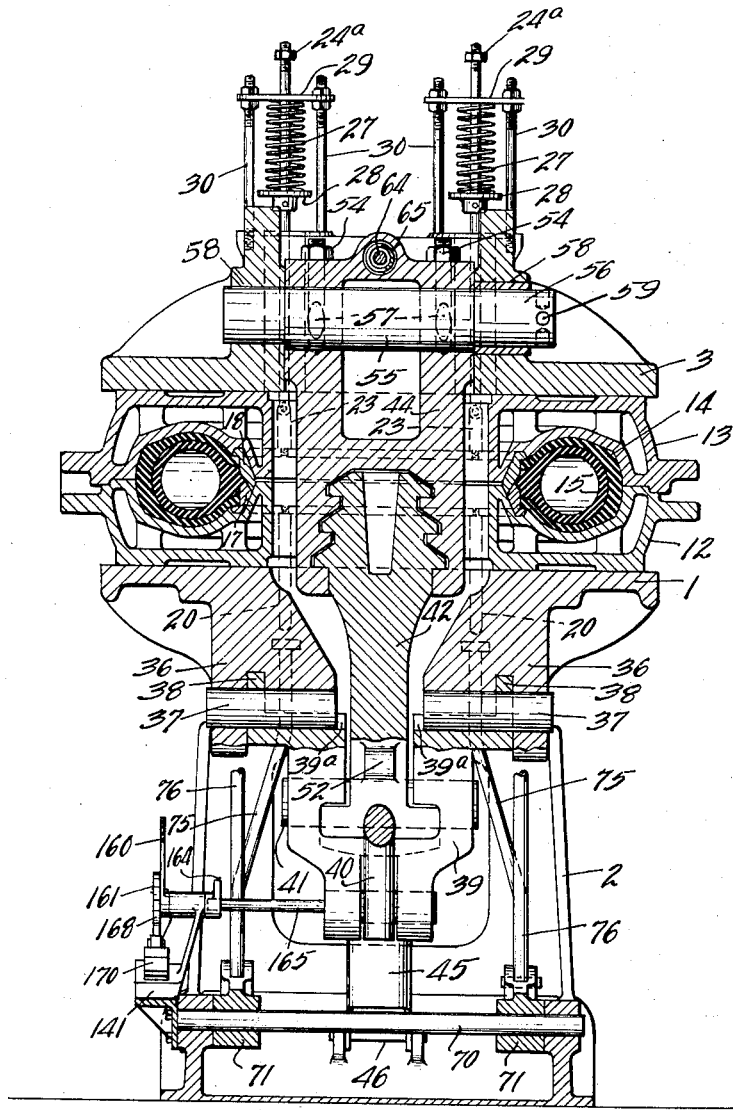
Figure 6 is a sectional view taken on line 6—6 of Figure 1.

The locking block 44 is carried by the upper mold section and depends therefrom so as to project through the mold in position to be engaged by the locking post. For the purpose of accurately adjusting the block, it is preferably adjustably secured by bolts 54 to an eccentric central portion 55 of a shaft 56 journaled in the upper platen 3 (Figure 6). The clamping bolts 54 are arcuately recessed, as at 57, which recesses lie against the circumference of the eccentric 55, so by drawing the bolts upwardly the block is clamped at any position about the shaft. The ends of the shaft are received in bearings 58 in the upper platen and are rotated to any position by means of openings 59 in the end of the shaft in which a turning bar may be inserted. This adjustable eccentric mounting of the locking block allows its effective length to be changed to vary the ultimate clamping pressure exerted by the lever mechanism. In order that the locking block 44 may have limited rotation with the shaft 56, it is formed above the shaft with a chamber 60 in which is located a plunger 63 having a reduced extension 64 which passes through the rear wall of the chamber. The plunger is urged outwardly by a compression spring 65 located within the chamber. As illustrated in Figure 2, the plunger 63 is formed with a rounded end which slidingly contacts with a vertical wall 66 formed upon the upper platen 3, to force the locking block 44 back until the corner of the chamber abuts with an adjustable stop screw 67 located on the upper platen. Due to the yieldable mounting of the block 44, the locking post 42 and the block 44 will pass into interlocking engagement when the vulcanizer is closed, the upper member of the couple yielding sufficiently to permit the parts to engage throughout their mating portions.

It will be evident that the interlocking portions of the locking post 42 and block 44 may take a plurality of shapes. However, in the preferred form the locking block 44 is formed with a semi-circular groove or socket in its lower end, the walls of which, as best shown in Figures 2 and 6, are formed with a series of buttress-shaped ribs 68 having flat upper surfaces. The locking post 42 is likewise formed at its upper end with the series of buttress-shaped but reversely disposed ribs 43ᵃ to cooperate with the ribs of the block 44. The faces of the locking formations are tapered as shown so that the plurality of ribs and buttresses will properly engage throughout their entire locking surfaces. The end of the locking post and of the socket in the locking block are slightly tapered as at 44ᶜ and 42ᶜ to permit the locking post and block to more readily slide into and out of engagement. These tapered surfaces also contact in the breaking of the toggle to crack the mold sections apart as hereafter explained.

As the vulcanizer is opened, the lower bead ring is lifted from its seat in the lower mold section, carrying the tire away from the lower mold surface. In order to move the rods 20 to lift the bead ring 17 and tire 14 away from the lower mold half 12, the following mechanism is provided. A shaft 70 in the base 2 pivotally carries a pair of rocker levers 71, the ends of which are pivotally connected by links 72 to the extensions 73 on the ends of the arms 6ᵃ. Push rods 75 and 76 are pivotally attached to the forward ends of the rocker levers 71 and extend slidably through the lower platen 1 in position to engage with and elevate the rods 20 when the levers 71 are actuated during the opening of the vulcanizer. It will be seen from the drawings that the push rods 75 and 76 are connected to the lever 71 at different distances from the pivoting shaft 70. This construction causes the push rods 75, which are at the outer ends of the levers, to travel farther than the rods 76 so that in the open position the lower bead ring 17 and tire 14 will be carried as shown in Figure 2 with respect to the lower mold 13. The object of this arrangement is to insure the more rapid elevation of the front side of the bead ring, so that the tire is peeled away from the lower mold surface. When the vulcanizer is open, the ring acts as a seat to receive the green tire which is lowered into contact with the mold section 13 as the vulcanizer is closed. This prevents premature contact of the tire with the one side of the mold. The tire is stripped from the upper mold section by expansion of the springs 27 which are compressed against the plates 29 upon the closing of the vulcanizer. The fact that one side of the upper bead ring 18 only is spring supported and that that side is permitted a greater degree of travel, also serves to peel the tire away from the upper mold section.

The operation of the vulcanizer to the point now reached in the description is as follows:

The vulcanizer being open, as shown in Figure 2, the tire with its air bag 15 therein is laid upon the lower bead ring 17 and the air bag is connected to the flexible pressure line and to the flexible exhaust line. Hydraulic pressure is then relieved from below the piston in the cylinder 33 and the weight of the upper platen and the parts carried thereby lowers the upper mold section in position where it settles in register through the flexible connections at 7 and 8, the cylinder 33 being bodily moved. As the vulcanizer is closed, the lower bead ring 17 is lowered and the upper bead ring engages the upper bead of the tire. At the same time the locking post and the locking block are brought into opposition. Fluid pressure admitted above the piston will now advance it through its remaining travel and the lever 39 will be rocked about its pivot 37, the first result of which is to move the lug 52 away from the surface 53 which permits the spring 49 to rock the locking post 42 so that the mating surfaces will engage with the corresponding surfaces on the block 44. The continued movement of the lever 39 will bring the points 41 below the points 37 and the mold sections will be given a powerful squeeze through the leverage exerted thereby. Upon opening the mold, the post 42 will be elevated, the upper end of the post 42ᶜ striking against the end of the socket 44ᶜ of the locking block and serving thereby to exert a powerful cracking action on the mold. The combined movement of the lever 39 will disengage the locking elements by the contact between 52 and 53 and the bead rings will free the tire in the manner described.

The operation of the vulcanizer is made automatic by the provision of a time control unit, the details of which are not illustrated. This unit is indicated by the numeral 79 and controls a plurality of diaphragm valves 80, 81, 82, 83, 84 and 85. A plurality of conduits 86, 87, 88, 89 and 90 extend from the control unit 79 to the diaphragms of the various valves. A hand operated valve 95 is provided in the conduit 88, 89 which valve when open supplies air under pressure to the valves 80 and 81 to operate the same.

The valves 80 and 81 control the operation of the pressure cylinder 33 by controlling the passage of fluid under pressure through flexible leads 93 and 94 to opposite ends thereof. Inlet and outlet pipes for the pressure fluid controlled by the valves 80 and 81 are indicated at 96 and 97, respectively. The connection between the valves 80 and 81 and the cylinder is such that when fluid under pressure is admitted behind the piston at one end of the cylinder, the other side of the piston is subjected to atmospheric pressure only.

One side of the valve 82 is connected to a drain pipe 98 and one side of the valve 83 to a hot water inlet pipe 100. The other sides of the valves 82 and 83 are connected together as at 104 from which piping extends to the pressure bag 15 through the agency of flexible leads 101.

The valve 85 is attached to a hot water outlet pipe 108 and to a pipe 109 which is connected to the water bag 15 by a flexible lead 101ᵃ. The valve 83 is connected to a vacuum line 111 on one side and to the pipe 109 on the other, whereby the bag 15 may be evacuated upon completion of the cure.

In the usual practice steam is constantly circulated by suitable means, not shown, through the cavities of the molds 12 and 13 both in the open and closed positions which eliminates the necessity of automatic valve control for the steam. This is possible because the mold is open for only a short time and when it is open the tire, whether cured or uncured, is supported at a distance from the mold. It is apparent, however, that additional diaphragm valves controlled by the unit 79 may be employed to turn the steam on and off in the opening and closing of the vulcanizer.

A dog 115 pivotally secured to the lower end of the pressure cylinder and yieldingly urged outwardly therefrom by a compression spring 116 cooperates with a notch 40ᵃ in the end of the piston rod 40 to hold the piston in the cylinder in its inward position as shown in Figure 2.

Extending from and secured to one side of the lower platen 1 is a cylindrical housing 119 (Figures 8, 9 and 10) which carries the valve 95. The valve 95 is operated by a shaft 120 attached thereto which is extended as at 121 and journaled in brackets 119ᵃ extending from the cylindrical housing 119. A second pair of brackets 119ᵇ extending from the cylindrical housing serve to journal a shaft 122. A pair of arms 123 and 124 secured to the shafts 120 and 122, respectively, are connected by a link 125 so that movement of a handle 126 fastened on the shaft 122 will turn the shaft 120 to operate the valve 95.

The cylindrical housing 119 in conjunction with the lower platen 1 journals a shaft 130 to which is secured an arm 131 adapted to cooperate, upon the partial rotation of the shaft 130, with a pin 132 fixed in the dog 115 to lift the dog out of the way to allow the piston rod 40 to be moved outwardly of the piston. In order to rotate the shaft 130, arm 135 is secured to the end of the shaft and at its end it is provided with a roller 136 which cooperates with a cam 126ᵃ which may be formed integral with the handle 126. A tension spring 137 is connected between the end of the arm 131 and the lower platen 1 and serves to hold the roller 136 of the arm 135 against the cam 126ᵃ at all times. The action of the cam 126ᵃ is such that when the vulcanizer is open and the handle 126 is up, as shown in Figure 2, the dog 115 will be in engagement with the notch 40ᵃ of the piston rod 40, but when the handle 126 is moved down the cam will throw the arms 135 and 131 to move the dog 115 out of engagement.

Figure 8:
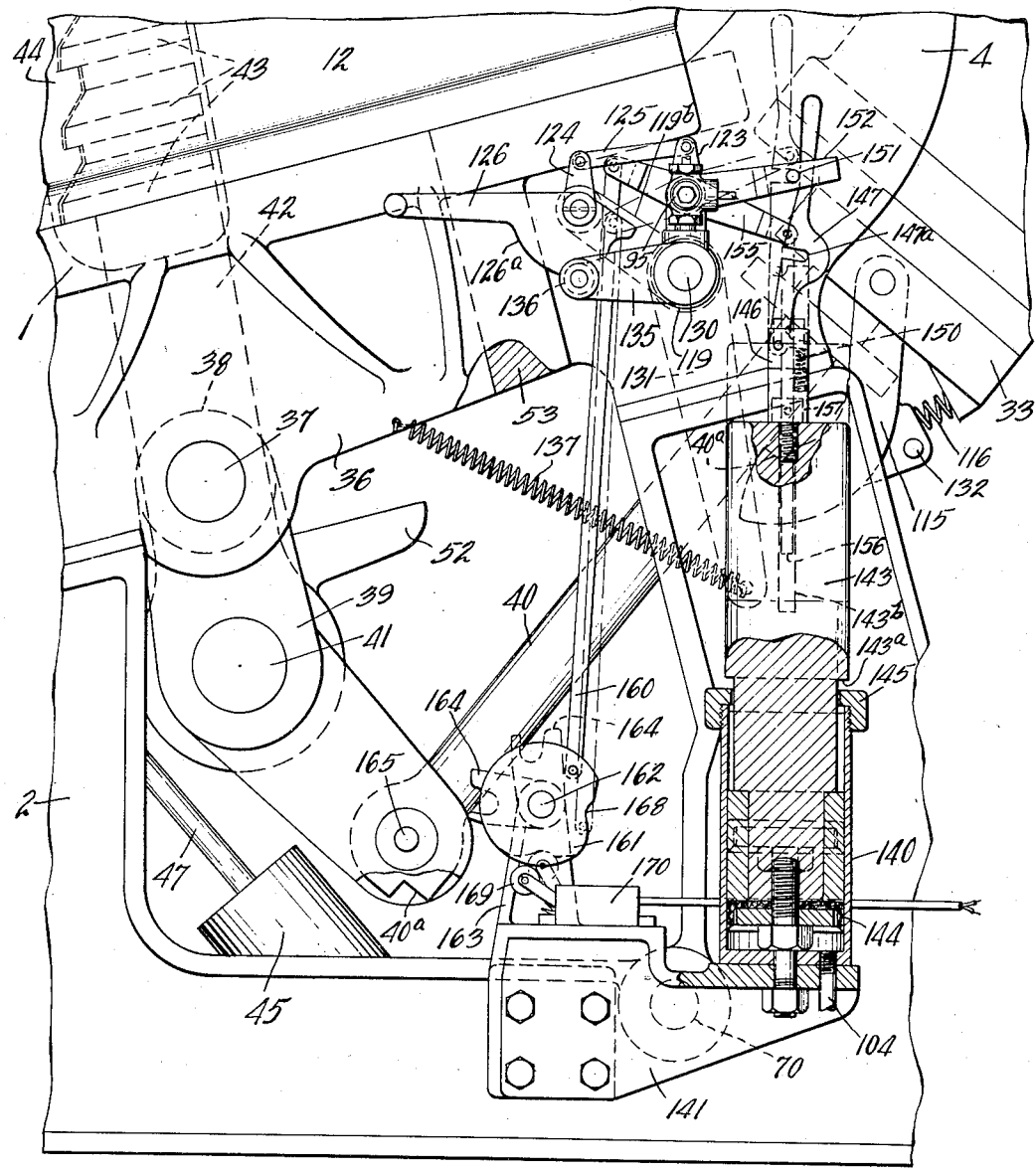
Figure 8 is an enlarged detailed side elevation of a portion of the control mechanism.

A particular feature of the invention is the automatic opening of the mold upon the completion of the cure. Means to accomplish this include (Figure 8) a cylinder 140 carried on a bracket 141 secured to the base 2. A relatively heavy weight 143 is received in the cylinder 140 and is provided at its lower end with suitable means, such as shown at 144, to make a sliding piston fit with the cylinder. The movement of the weight in the cylinder is limited by a cap 145 secured to the top of the cylinder 140 which cooperates with shoulders 143a on the weight. As illustrated in Figures 1 and 8, the pipe 104, which supplies the water bag 15 with water under pressure, is also connected to the bottom of the cylinder 140. A post 146 secured to the top of the weight 143 pivotally carries a handle 147 which is yieldingly urged toward the cylindrical bracket 119 by a compression spring 150. The handle 147 is formed with a slot 147a which removably engages with a pin 151 secured to the end of an arm 152 fastened to the shaft 121.

A lever 155 is pivotally carried on the shaft 121 and at one end is pivotally connected to a rod 156 which slides in a hole 143b in the weight 143. A collar 157 adjustably secured to the rod 156 is provided to limit the movement of the rod 156 into the hole 143b. The other end of the lever 155 is connected by a link 160 to a cam disk 161 secured to a shaft 162 journaled in a bracket 163 mounted on the bracket 141. The shaft 162 also carries a U-shaped finger 164 which is adapted to engage with a pin 165 carried on the lower end of the lever 39.

The cam disk 161 is provided with a recess 168 and against the cam rides a spring pressed pivoted lever 169 which, by the operation of the cam, opens or closes a switch 170 on the bracket 163. This switch sets in motion electric clock mechanism which controls the length of the cure, the clock being contained in the control unit 79.

The operation of the automatic control for the vulcanizer is as follows:

The vulcanizer is in the open position as shown in Figure 2 and an unvulcanized tire 14 with a pressure bag 15 therein placed on the lower bead ring 17 and the flexible leads 101 and 101a connected to the stems of the bag. The vulcanizer is locked in the open position by the engagement of the slot 147a with the pin 151 carried by the arm 152 which is secured to the shaft 121. Thus it is impossible for shaft 121 to be moved, which movement controls the closing of the vulcanizer unless the handle 147 be moved to disengage the slot 147a and pin 151. The handle 126 is gripped in the left hand and the handle 147 in the right hand of the operator, and the handle 147 is pushed toward the rear of the vulcanizer to move the slot 147a therein out of engagement with the pin 151 carried by the arm 152 so that the operator can rock the shafts 121 and 120 by moving with his left hand the handle 126 down to the position shown in Figures 1 and 8. The control of the vulcanizer thus requires two hands which prevents any accidental operation of the operating levers. The rocking of the shafts 120 and 121 by the downward movement of handle 126 takes place through the arms 123 and 124 and link 125 and turns the valve 95 so that air is supplied behind the diaphragms of the valves 80 and 81 which opens the lower end of the cylinder 33 to the atmosphere and supplies the upper end with fluid under pressure which, in addition to the weight of the upper platen moves the piston and the cylinder. However, before this relative movement can or actually begins to occur, the dog 115, which also locks the vulcanizer in the open position, is disengaged from the notch 40a in the piston rod 40 by the same movement of the handle 126 which opened the valve 95. This downward movement of the handle 126 rotates the cam 126a which acts through roller 136, arm 135 and shaft 130 to swing the arm 131 into engagement with the pin 132 carried by the dog 115 to move the dog out of engagement with the notch 40a. The provision of the dog 115 on the vulcanizer allows it to be locked in the open position without necessitating that fluid under pressure be continuously furnished to the lower end of the pressure cylinder, and assures that the vulcanizer will not close if the pressure upon the line is accidentally lost.

As the relative movement of the piston 40 and cylinder 33 begins, the piston remains stationary and the cylinder moves outwardly on the piston, due to the weight of the movable platen 3. This outward movement of the cylinder 33 moves the platen 3 from the open position shown in Figure 2 to the partially closed position seen in Figure 5.

The action of the lever 39 to lock the two mold sections together has already been described, but it will be observed that the movement of the lever 39 also controls the admission of pressure to the bag so that pressure is not applied until the mold sections are given their final squeeze.

As the lever 39 is moved to its final closed position, the pin 165 engages with the U-shaped arm 164 to rotate the shaft 162 and cam 161 so that the switch 170 is closed. The closing of the switch 170 starts the electric clock contained in the control unit 79.

The control unit 79 upon the starting up of the clock immediately opens the valves 83 and 85 by applying air pressure to the diaphragms thereof so that hot water or other fluid heating means under pressure will be circulated through the bag 15 via the inlet pipe 100 and outlet pipe 108. The hot water not only serves to force the tire to properly fill the mold, but also serves to cure the tire from the inside out. Simultaneously with the opening of the valves 83 and 85, the drain valve 82 is, of course, closed. A portion of the water adapted to circulate under pressure through the bag 15 is carried down through the pipe 104 to the bottom of the cylinder 140 which forces the weight 143 up to its upward position shown in dotted lines in Figure 8.

The upward movement of the weight 143 causes the handle 147 to slide up on the pin 151 until the slot 147a comes into relation therewith, at which time the compression spring 150 will move the slotted handle over the pin (dotted lines Figure 8).

The weight 143, in raising, will also pick up the collar 157 secured to the rod 156 to tip the lever 155 which, through the link 160, will rock the cam disk 161 to rotate the shaft 162 and turn the switch 170 off and move the arm 164 to the vertical position. The switch 170 may be opened without stopping the time clock as it merely serves as a push button in a standard closing circuit.

The weight 143 will remain in the raised position as long as water is circulated through the bag 15. Steam or other fluid heating means will be continuously circulated through the jacketed molds 12 and 13 so that the tire will be uniformly vulcanized by heat applied both inwardly and outwardly of the tire. The length of the cure is determined by the setting of the time clock in the control unit 79. The cure is terminated when the set time has elapsed by the closing of the valves 83 and 85 to stop the circulation of the water through the bag 15 and the opening of the drain valve 82. With the valves in this position, the water in the cylinder 140 below the weight 143 will drain out and allow the weight to drop to the full line position shown in Figure 8. The valve 84 controlling the vacuum may be opened for a short time, after the water has drained from below the weight 143, to exhaust the bag 15 which will allow the tire 14 to be more readily removed therefrom. A one way valve in the drain line will prevent the vacuum from acting back through the drain. The vacuum valve will be closed by the control unit 79 as soon as the bag has been exhausted. As the weight 143 drops, it carries the handle 147 with it, which is in engagement with the pin 151 of the arm 152, thus rocking the shafts 121 and 120 and moving the valve 95 to the closed position.

With the valve 95 in the closed position, the valves 80 and 81 will be moved to their original position which will exhaust the upper end of the pressure cylinder 33 and apply fluid under pressure to the lower end thereof, thus causing the relative inward movement of the piston and cylinder. This movement will break the toggle by swinging the toggle lever 37 up about the hinge 38. The breaking of the toggle and the upward movement of the locking post 43 also serves to crack or break the mold halves apart in that the end 42c of the locking post will contact with the end of the socket 44c in the locking block 44 to positively force the platens and the mold halves carried thereby apart.

Figure 5:
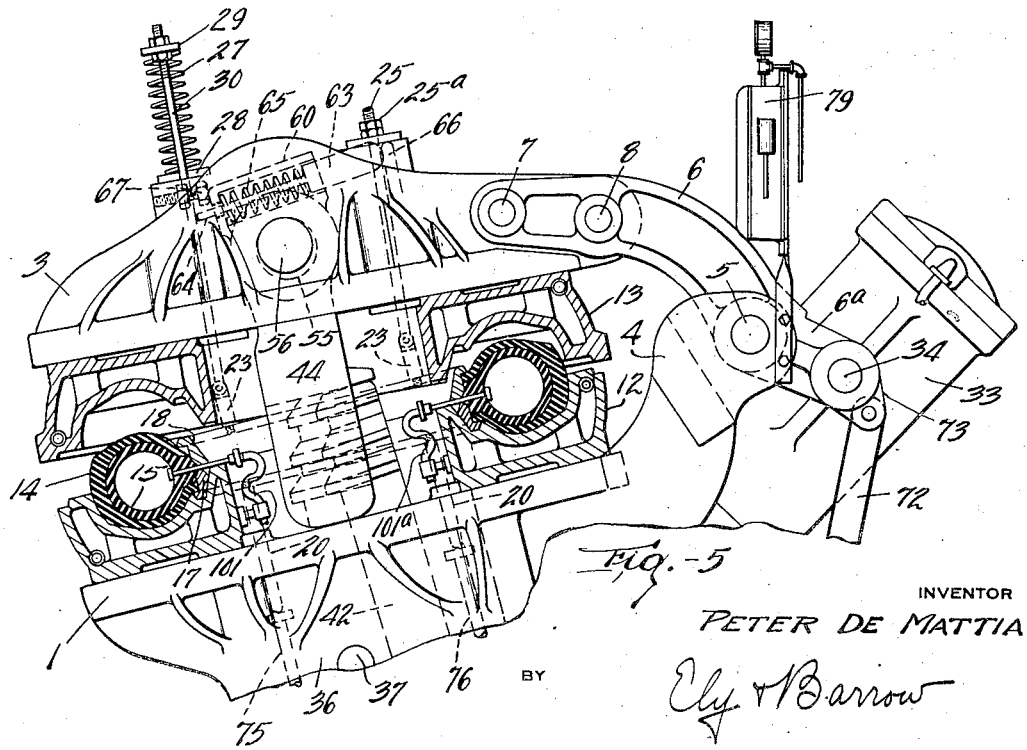
Figure 5 is a view similar to Figure 1 showing the position of the various parts just after the vulcanizer has started to open.

As soon as the mold halves begin to move apart, the compression springs 27, acting through the rods 24, force the front edge of the upper bead ring 18 down against the tire which breaks the front portion of the tire away from the upper mold 12. The tire being broken away from the front portion of the upper mold will readily pull entirely loose from the upper mold as shown in Figure 5 upon further opening movement of the platens.

The electric cure-time clock contained in the control unit 79 has meanwhile automatically stopped soon after the water circulating valves 83 and 85 have been shut and the drain valve 82 opened by the unit. The apparatus will thus be back in the original position as shown in Figure 2. The flexible leads 101 and 101a may now be removed from the pressure bag stems and the cured tire with the bag therein removed from the supporting bead ring. A green or uncured tire with a bag therein may be placed on the bead ring and the entire operation repeated.

The length of the cure and the exact sequence of the valve operations can be set as desired in the control unit 79 which will then function as set until for any reason the control is reset.

If it is desired to cure tires of other sizes in the vulcanizer, the mold halves removably secured to the respective platens may be replaced by mold halves of the desired shape and size.

If the clamping action exerted by the toggle is either insufficient or too great, due to a change in molds or in making the initial adjustment of the vulcanizer, the bolts 54 clamping the locking block 44 on the shaft 56 are loosened and the shaft 56 is rotated with respect to the block so that the eccentric portion 55 of the shaft will change the ultimate length of the block 44. When the correct length of the block has been found, the bolts 54 are again tightened.

The force of springs 27 which break the tire loose from the upper mold half may be adjusted by varying the position of the cross-head 29. The lock nuts 24a and 25a can be adjusted to vary the extent of downward movement of the bead ring 18. The stop 67 may also be adjusted to control the swinging movement of the locking block 44.

It will be apparent that while the invention has been particularly described with respect to the curing of pneumatic tires, it may readily be adapted to cure molded or form inner tubes, in which case the pressure bag is omitted and the bead rings may take the form of a single, lower supporting ring. The mold halves 12 and 13 are of course replaced by suitable inner tube molds. Numerous other articles of a plurality of shapes and sizes may obviously be cured in suitable molds secured between the platens.

The mold halves may be made integral with the respective platens or the cavities for circulating the steam adjacent the article to be vulcanized may be made in the platens rather than in the molds, particularly where relatively flat articles are vulcanized.

If desired, the automatic features of the invention may be eliminated and the vulcanizer be opened and closed by hand operation of the valve controlling the toggle-operating fluid pressure cylinder 33.

It will be evident from the foregoing that a fully automatic vulcanizer has been provided in which novel means break the cured tire away from the mold sections when the vulcanizer is opened and which means carry the cured or an uncured tire spaced from the mold sections at all times when the vulcanizer is in the open position.

As many changes could be made in the construction, it is intended that all matter contained in the above description or shown in the accompanying drawings shall be interpreted as illustrative only and not in a limiting sense. Accordingly, modifications and applications of the invention can be resorted to without departing from the spirit of the invention or the scope of the appended claims.

What is claimed is:

1. In a vulcanizer, a fixed platen, a movable platen, a hinge connection between said platens, an arm associated with the movable platen for operating the same, a lever pivoted to said fixed platen, a locking block centrally secured to said movable platen and extending toward said fixed platen, a locking post pivoted to said lever between the ends thereof, yielding means normally urging the locking post toward locking position, said locking post being adapted to engage and disengage with said locking block upon the back and forth movement of the lever, and a fluid pressure device connected to the arm and to the lever.

2. In a vulcanizer, a fixed platen, a movable platen, a hinge connection between said platens, a lever pivotally fastened at one end to said fixed platen, a locking block secured to said movable platen, a locking post pivotally fastened to said lever between the ends thereof, yielding means to cause the post to engage and disengage with said locking block with the movement of the lever, and means to operate said devices.

3. In a vulcanizer, a fixed platen, a movable platen, a hinge connection between said platens, a lever pivoted to said fixed platen, a locking block secured to said movable platen and adapted for limited movement with respect thereto, a locking post pivotally fastened to said lever between the ends thereof, yielding means normally urging the locking post toward locking position, said locking post being adapted to engage and disengage with said locking block upon the back and forth movement of the lever, and means to actuate said devices.

4. In a vulcanizer, a fixed platen, a movable platen, a hinge connection between said platens, a lever pivoted to said fixed platen, a locking block secured to said movable platen, a locking post pivotally fastened to said lever between the ends thereof and adapted to engage and disengage with said locking block upon the back and forth movement of the lever, yielding means controlling the angular relation of said locking post and said lever, and means to actuate said devices.

5. In a vulcanizer, a fixed platen, a movable platen, a hinge connection between said platens, a lever pivoted to said fixed platen, a locking block secured to said movable platen, a locking post pivoted to said lever between the ends thereof and adapted to engage and disengage with said locking block upon movement of the lever, means controlling the angular relation of said locking post and said lever, said means including mechanism yieldingly urging said locking post in one direction with respect to said lever and a stop to control the swinging action of said mechanism, and means to actuate said devices.

6. In a vulcanizer, a fixed platen, a movable platen, a lever pivotally fastened at one end to said fixed platen, a locking block secured to said movable platen, a locking post pivoted on the lever between the ends thereof and adapted to engage and disengage with said locking block upon the movement of the lever, means controlling the angular relation of said locking post and said lever, said means including mechanism yieldingly urging said locking post toward said locking block and means to disengage the same, and means to actuate said devices.

7. In a vulcanizer, a fixed platen, a movable platen, a hinge connection between said platens, a lever pivoted at one end to said fixed platen, a locking block centrally secured to said movable platen, a locking post pivoted to said lever between the ends thereof and adapted to cooperate with said locking block at the center of the vulcanizer, and a pressure cylinder to actuate the movable platen, the piston thereof being connected directly to the lever.

8. A vulcanizer comprising a pair of opposed relatively movable platens, a lever pivoted at one end to one of said platens, a locking block yieldably and centrally secured to the other of said platens and extending toward said first named platen, a locking post pivotally attached to said lever and extending toward said last named platen and adapted to cooperate with said locking block upon movement of the lever to tightly clamp the platens together, and means pivotally secured on said last named platen for substantially simultaneously moving said platens together and for swinging said lever to engage the locking post and block and upon further movement to draw the platens together.

9. A vulcanizer comprising a pair of opposed relatively movable platens, a lever pivoted to one of said platens, interlocking devices extending across the platens and engaging at the center of the vulcanizer, one of said devices being carried upon the lever, and means for substantially simultaneously moving said platens together and for swinging said lever to engage the interlocking means and upon further movement to draw the platens together.

10. A vulcanizer comprising a pair of opposed relatively movable platens, a lever pivoted to one of said platens, a locking block secured to the other of said platens, a locking post pivotally attached to said lever and adapted to cooperate with said locking block upon movement of the lever to clamp the platens together, yielding means normally urging the locking post toward locking position and means for substantially simultaneously moving said platens together and for swinging said lever to engage the locking post and block and upon further movement of the lever to draw the platens together.

11. A vulcanizer comprising a pair of opposed relatively movable platens, a lever pivoted to one of said platens, a locking block secured to the other of said platens, a locking post pivotally attached to said lever and adapted to cooperate with said locking block upon movement of the lever to clamp the platens together, yielding means normally urging the locking post toward locking position and means for moving said platens together and for swinging said lever to engage the locking post and block and upon further movement of the lever to draw the platens together.

12. A vulcanizer comprising a fixed platen, a movable platen hinged thereto, an arm secured to said movable platen, a lever pivotally fastened to said fixed platen, a locking member secured to said movable platen, a second locking member carried by said lever and adapted to cooperate with said first named locking member, means connected between said lever and said arm to both operate said lever and to move said movable platen, mating mold sections on the respective platens, and means associated with the mold sections to remove the cured article from the mold sections and hold it in spaced relation therewith upon the opening of the vulcanizer.

13. A vulcanizer comprising a fixed platen, a movable platen hinged thereto, an arm secured to said movable platen, a lever pivotally fastened to said fixed platen, a locking member secured to said movable platen, a second locking member carried upon said lever and adapted to cooperate with said first named locking member, expansible means mounted upon said arm and connected to said lever, and mating mold sections on the respective platens.

14. A vulcanizer comprising a fixed platen, a movable platen hinged thereto, an arm secured to said movable platen and extending past the hinge connection, a lever pivoted to said fixed platen, a locking member secured to said movable platen, a second locking member pivoted to said lever and adapted to cooperate with said first named locking member, means mounted upon said arm and connected to said lever to operate said lever and to move said movable platen, and mating mold sections on the respective platens.

15. In a vulcanizer the combination of relatively movable mating mold sections, clamping means on one section extending across the center of the vulcanizer adapted to hold said mold sections together, a single pivoted lever connected to the clamping means, and operating means for simultaneously moving said mold sections into relation and for operating said lever and clamping means, said operating means being adapted to crack the sections apart and to move them to their original positions.

16. In a vulcanizer, a fixed mold section, a movable mold section, a hinge connection between said mold sections, an arm associated with the movable mold section and extending past the hinge connection, a lever pivoted at one end to said fixed mold section, a locking block secured to said movable mold section, a locking post pivoted to said lever between the ends thereof and adapted to engage and disengage with said locking block upon the movement of the lever, and a fluid motor mounted upon the extending arm of the movable mold section and connected to the lever.

17. In combination in a pneumatic tire vulcanizer employing an internal curing water bag, a pair of relatively movable upper and lower mold sections, means for clamping said mold sections together, a single fluid pressure device for operating the clamping means and for raising the upper mold section, a dog locking said vulcanizer in the open position, and means for simultaneously releasing said dog and operating said device to close the vulcanizer.

PETER DE MATTIA.